(12) United States Patent
Deligiannis

(10) Patent No.: US 9,141,116 B2
(45) Date of Patent: Sep. 22, 2015

(54) AUXILLARY SWITCH FOR MULTIPLEXED CONTROL AND GROUND SIGNAL FROM A THERMOSTAT

(75) Inventor: Jorge Deligiannis, Ottawa, CA (US)

(73) Assignee: ENERGATE INC., Ottawa (CA)

( * ) Notice: Subject to any disclaimer, the term of this patent is extended or adjusted under 35 U.S.C. 154(b) by 1097 days.

(21) Appl. No.: 13/075,696

(22) Filed: Mar. 30, 2011

(65) Prior Publication Data

US 2012/0248208 A1    Oct. 4, 2012

(51) Int. Cl.
*F25D 21/06*    (2006.01)
*F25B 19/00*    (2006.01)
*H04J 11/00*    (2006.01)
*H04J 3/04*    (2006.01)
*G05D 23/19*    (2006.01)

(52) U.S. Cl.
CPC ................... *G05D 23/1902* (2013.01)

(58) Field of Classification Search
CPC .......... G05D 23/1902; G05D 23/1919; G05D 23/2208; F24F 11/0086; F24F 11/006; F24F 11/00

USPC ............. 236/1 C; 700/276; 370/203, 208, 63, 370/532; 62/157, 231
See application file for complete search history.

(56) References Cited

U.S. PATENT DOCUMENTS

| | | | | |
|---|---|---|---|---|
| 3,964,023 | A | * | 6/1976 | Fauchez ..................... 340/12.12 |
| 4,095,740 | A | * | 6/1978 | Wirth .............................. 236/47 |
| 4,131,882 | A | * | 12/1978 | Hollabaugh et al. ........ 340/12.33 |
| 4,222,035 | A | * | 9/1980 | Lohoff ......................... 340/12.32 |
| 4,990,908 | A | * | 2/1991 | Tung ............................... 340/4.3 |
| 5,331,619 | A | * | 7/1994 | Barnum et al. ................... 700/3 |
| 5,914,606 | A | * | 6/1999 | Becker-Irvin ................. 324/434 |
| 7,538,297 | B2 | * | 5/2009 | Anderson et al. ............. 219/260 |
| 7,922,100 | B2 | * | 4/2011 | Deligiannis ................... 236/1 C |

* cited by examiner

*Primary Examiner* — M. Alexandra Elve
*Assistant Examiner* — Henry Crenshaw
(74) *Attorney, Agent, or Firm* — Gowling Lafleur & Henderson LLP

(57) ABSTRACT

An auxiliary switch is provided that allows a thermostat to use full wave rectification for power while still communicating control information to the auxiliary switch over a multiplexed ground-control line to control associated equipment.

28 Claims, 10 Drawing Sheets

(A)

(B)

(C)

Expected signal with no multiplexed control information (A)

Received signal with multiplexed control information (B)

Control information (C)

AUXILLARY SWITCH FOR MULTIPLEXED CONTROL AND GROUND SIGNAL FROM A THERMOSTAT

CROSS-REFERENCE TO RELATED APPLICATIONS

None

FIELD OF THE INVENTION

The present disclosure relates to multiplexing a control signal and a ground reference signal, and in particular to multiplexing a control signal and a ground signal from a thermostat using full-wave rectification for power.

BACKGROUND

Older thermostats are effectively a switch that closes a circuit for a low-voltage AC signal, for example 24 volts historically, that operates a relay to turn on or off the HVAC equipment. These older thermostats only required two lines, or wires, to connect and control the HVAC equipment.

Thermostats requiring power are increasingly used to control heating, ventilation and air conditioning (HVAC) equipment. These thermostats may be powered by a battery or from an externally supplied alternating current (AC) source. In thermostats powered by an AC source, at least three wires are generally required for connecting and controlling the HVAC equipment. Two wires provide a path for the AC power, while a third is used as a control signal line for controlling operation of the HVAC equipment.

In order to connect a powered thermostat requiring three wires in a location that is only provided with two wires, a ground wire adapter can be used. The ground wire adapter allows a thermostat that uses half-wave rectification of the AC signal to power the thermostat to communicate the control information to the ground wire adapter over the return wire used for the AC signal. Since the thermostat uses half-wave rectification, there would normally not be any current flowing through the return wire during a negative half-cycle of the AC signal. By causing the thermostat to conduct during the negative half-cycle, the thermostat can provide control information to the ground wire adapter in each negative half-cycle of the AC signal. The ground wire adapter can detect the signal in the negative half-cycle and control the HVAC equipment accordingly.

While the use of a ground wire adapter allows a three wire thermostat to be connected over two wires, it requires that the thermostat use only half-wave rectification, limiting the possible power consumption and efficiency of the thermostat.

It is desirable to allow a thermostat to use full wave rectification while still allowing a control signal to be multiplexed on a ground line.

SUMMARY

In accordance with an aspect of the present disclosure there is provided an auxiliary switch for a thermostat employing full-wave rectification. The auxiliary switch comprising: an alternating current (AC) power output terminal for coupling an AC signal to the thermostat. A ground-control output terminal for providing a thermostat ground reference to the thermostat over a common ground line. An adapter network connected between the ground-control output terminal and an auxiliary switch ground reference, the adapter network providing a maximum and minimum voltage drop between the auxiliary switch ground reference and the thermostat ground reference to provide a stable reference at an expected maximum current flow. A controller for determining voltage differences between a sensed voltage signal across the adapter network and an expected voltage signal at periodic time intervals and for de-multiplexing control information multiplexed onto the common ground line by the thermostat based on the determined voltage differences.

In accordance with another aspect of the present disclosure there is provided a method of communicating between an auxiliary switch coupled to a thermostat employing full-wave rectification. The method at the auxiliary switch comprising repeatedly measuring a voltage across an adapter network of the auxiliary switch during a start portion and end portion of each half-cycle of an alternating current (AC) signal provided to the thermostat over an AC power line relative to a common ground line; comparing the measured voltage to an expected voltage; and determining a communicated bit based on if the measured voltage differs from the expected voltage for de-multiplexing control information multiplexed onto the common ground line by the thermostat.

BRIEF DESCRIPTION OF THE DRAWINGS

Embodiments are described herein with reference to the appended drawings, in which.

DETAILED DESCRIPTION

Figure 1:
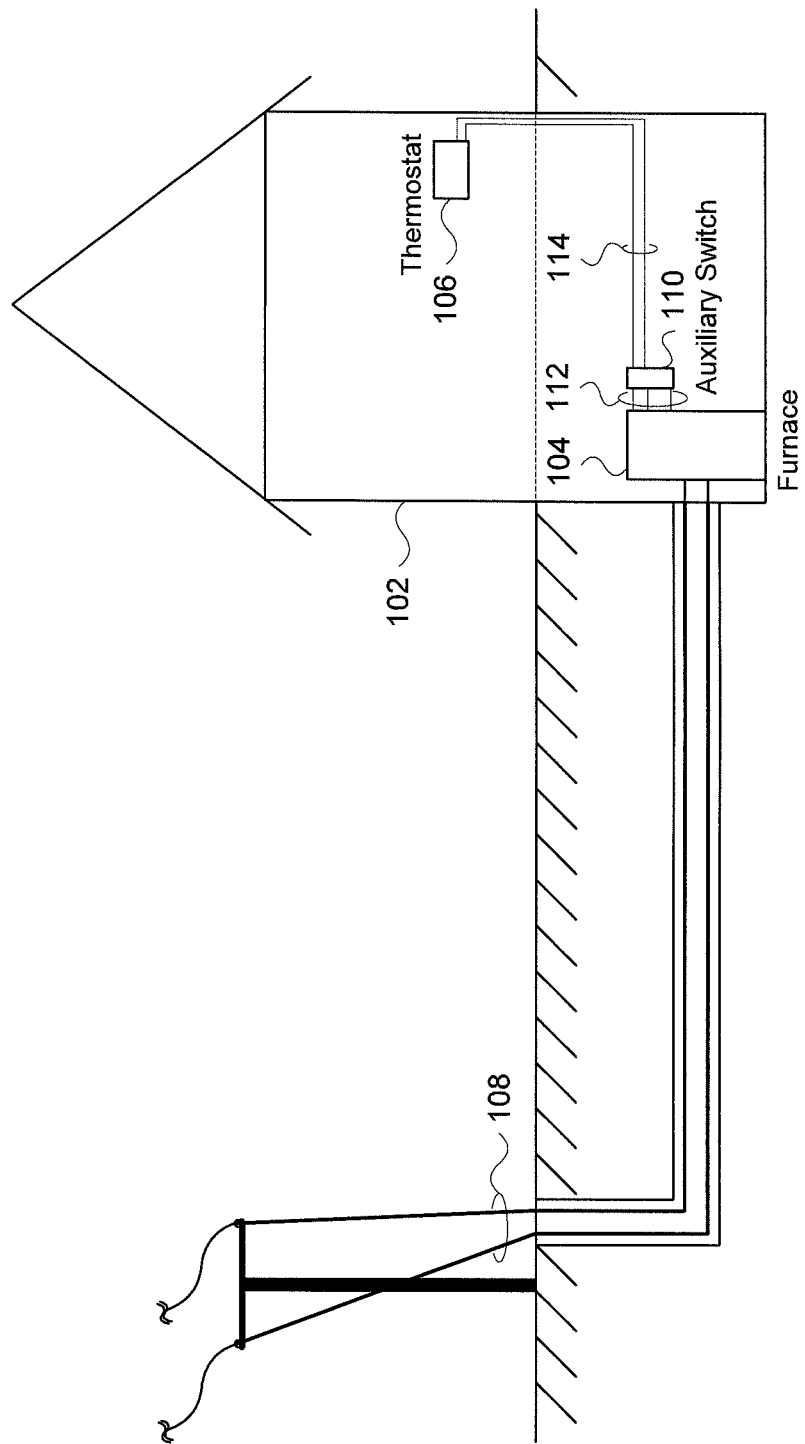
FIG. 1 depicts a diagram of an illustrative installation of a thermostat and HVAC equipment in which an auxiliary switch may be used.

It will be appreciated that for simplicity and clarity of illustration, where considered appropriate, reference numerals may be repeated among the figures to indicate corresponding or analogous elements. In addition, numerous specific details are set forth in order to provide a thorough understanding of the embodiments described herein. However, it will be understood by those of ordinary skill in the art that the embodiments described herein may be practiced without these specific details. In other instances, well-known methods, procedures and components have not been described in detail so as not to obscure the embodiments described herein. Also, the description is not to be considered as limiting the scope of the embodiments described herein.

FIG. 1 depicts a diagram of an illustrative installation of a thermostat and HVAC equipment in which an auxiliary switch may be used. A house 102 includes some HVAC equipment, which for simplicity of the description will be considered a furnace 104, that is controlled by a thermostat 106. The furnace 104 receives an alternating current (AC) signal for power from, for example an AC mains source 108. The furnace 104 may include a transformer for transforming the AC mains voltage to a lower AC voltage, typically 24 VAC. The furnace provides the 24 VAC signal to an auxiliary switch 110, which allows a three wire powered thermostat to be connected over two wires. As depicted the auxiliary switch 110 is connected to the furnace using three wires, which would include two wires for the 24 VAC signal path and one wire for a control signal. The control signal may be a 24 VAC signal for operating a relay, although other control signals are possible, including low-voltage direct current (DC) signals. The auxiliary switch 110 is connected to the thermostat using two wires 114. One wire provides the 24 VAC signal used for powering the thermostat 106 while the second wire is multiplexed to provide both a return path for the 24 VAC signal as well as control path for communicating HVAC control information to the auxiliary switch 110. The thermostat 106 is powered by the 24 VAC using full-wave rectification of the signal. Previous thermostats used half-wave rectification; however, as thermostats become more advanced, including large touch-screen interfaces and wireless communication abilities, the power requirements may require the use of full-wave rectification. The auxiliary switch 110 de-multiplexes the HVAC control information from the multiplexed ground-control line and provides the appropriate control signal to the furnace 104.

Figure 2:
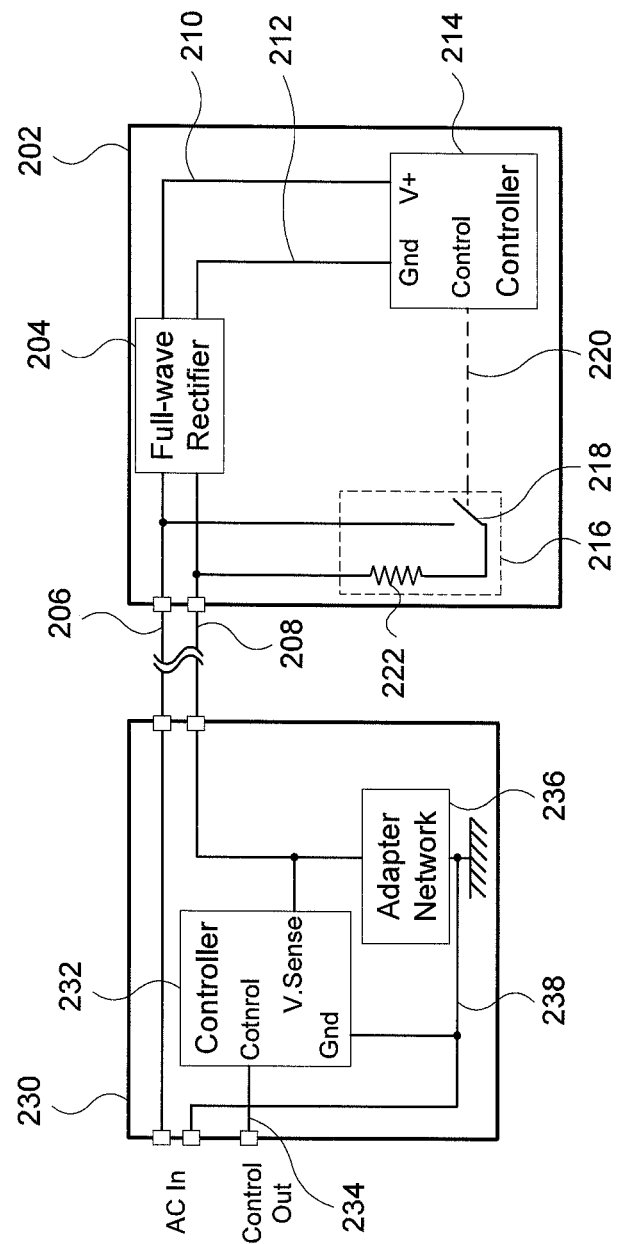
FIG. 2 depicts a block diagram of components of an auxiliary switch and a thermostat.

FIG. 2 depicts a block diagram of components of an auxiliary switch and a thermostat. The thermostat 202 includes a full-wave rectifier 204 connected to an AC power line 206 and a ground-control line 208, for providing a DC signal 210 and a thermostat ground reference 212 to a controller 214. The controller 214 controls the operation of the thermostat 202, including determining when HVAC equipment should be turned on or off, controlling a display (not shown) of information and input of information. The operation of thermostats with regards to determining whether or not HVAC equipment should be turned on or off is not described further herein.

The controller 214 further controls operation of a control information multiplexing component 216. The multiplexing component 216 comprises a switch 218 controlled by the controller 214. In particular a control signal 220 is provided by the controller 214 that opens or closes the switch 218. When closed, the switch 218 connects a resistor 222 between the AC power line 206 and the ground-control line 208. As a result, and without consideration of the operation of the auxiliary switch described further, a current will flow in the ground-control line 208, which may be used to communicate the HVAC control information indicating whether the HVAC equipment should be on or off. However, since the ground-control line 208 is used as a ground reference for the thermostat 202, the ground-control line 208 cannot have large voltage changes since the ground reference must provide a stable reference, within design tolerances, in order to ensure proper operation of the thermostat 202.

The thermostat 202 is connected to an auxiliary switch 230. The auxiliary switch 230 comprises a controller 232 that de-multiplexes the control information from the ground-control line 208 and generates the appropriate control signals 234 for turning on or off the HVAC equipment as determined by the thermostat 202. In particular the controller 232 senses a voltage across an adapter network 236 connected in series between an auxiliary switch ground reference 238 and the ground-control line 208. The auxiliary switch ground reference 238 provides a stable ground reference and may be provided by an earth ground connection. The adapter network 236 generates a voltage across corresponding to the current flowing through the ground-control line 208. As described above, the thermostat 202 can cause current to flow through the ground-control line 208 by closing the switch 218. In addition to generating a voltage that can be sensed by the control 232 in order to determine the control information multiplexed onto the ground-control line 208 by the thermostat 202, the adapter network 236 also limits the voltage across it so that the voltage on the ground-control line 208 will be maintained within an acceptable tolerance for use by the thermostat 202 as a thermostat ground reference. The voltage of the thermostat ground reference, relative to the auxiliary switch ground reference 238, may vary depending on the amount of current flowing through the ground-control line 208, and so the voltage across the adapter network 236. However, the adapter network 236 is designed in order to ensure that the voltage across the adapter network does not cause the ground-control line to be unusable as a thermostat ground reference. As described further with reference to FIG. 3, the controller senses the voltage across the adapter network 236 and determines the appropriate control signal for controlling the HVAC equipment.

Figure 3:
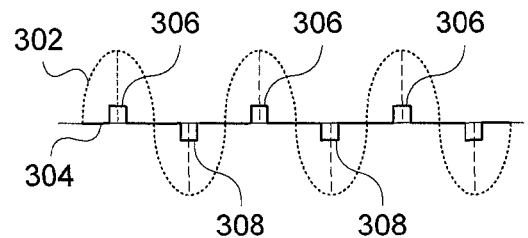
FIGS. 3A-3C depicts various signal diagrams associated with the operation of the thermostat and auxiliary switch.
Figure 3:
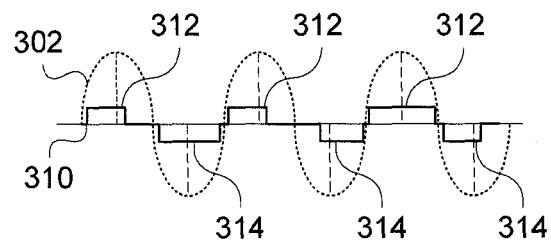
Figure 3:
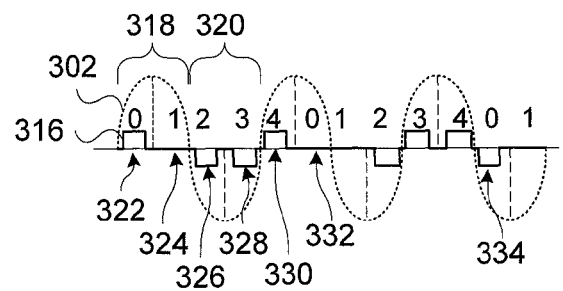

FIG. 3 depicts various signal diagrams associated with the operation of the thermostat and auxiliary switch. The signal diagrams are idealized signal diagrams for the purpose of describing the operation of the thermostat 202 and auxiliary switch 230. FIG. 3A depicts the AC power signal 302 relative to the auxiliary switch ground reference 238 and a voltage signal 304 measured across the adapter network 236. The voltage signal 304 corresponds to the switch 218 of the thermostat 202 being open such that the multiplexing component 216 does not cause additional current to flow. However, as is apparent from the FIG. 3A, current flows periodically resulting in positive voltage levels 306 and negative voltage levels 308. The current flow is a result of the full-wave rectifier 204, which acts as a resistor-capacitor (RC) circuit. Thus the voltage levels 306, 308 across the adapter network 236 correspond to the current flow during the charging of the RC circuit provided by the full-wave rectifier.

FIG. 3B depicts the AC power signal 302 relative to the auxiliary switch ground reference 238 and a voltage signal 310 measured across the adapter network 236. The voltage signal 310 includes positive voltage levels 312 and negative voltage levels 314. As described further with reference to FIG. 3C, the voltage signal 310 contains control information that can be detected by the controller 232. The positive voltage levels 312 and the negative voltage levels 314 are the result of the charging of the RC circuit provided by the full-wave rectifier 204 of the thermostat 202 as well as current flowing as a result of the multiplexer component 222, or more particularly the switch 218 being closed.

FIG. 3C depicts the AC power signal 302 relative to the auxiliary switch ground reference 238 and a difference signal 316 corresponding to the difference between the voltage signal 312 and the voltage signal 304. As noted above, the voltage signal 312 is the result of current flow due to the charging of the RC circuit provided by the full-wave rectifier 204 and current flow due to the operation of the multiplexing device 222. The voltage signal 304 is the result of the current flow due to the charging of the RC circuit provided by the full-wave rectifier 204. As a result, the difference 316 between these two signals corresponds to a voltage generated from the current flow resulting from operation of the multiplexing component 222. As depicted in FIG. 3C, it is possible to communicate four bits of information during a full cycle of the AC power signal 302. Since the charging of the RC circuit occurs about the positive and negative peaks in the AC power signal 302, it is possible to transmit a two bits of information during each half-cycle 318, 320 of the AC power signal 302. In particular, and with reference to the positive half-cycle 318 of the AC power signal 302, a bit 322 of information can be transmitted at the beginning of the positive half cycle before the charging of the RC circuit of the full-wave rectifier 204 occurs. A second bit 324 of information can also be transmitted at the end of the positive half cycle following the charging of the RC circuit of the full-wave rectifier 204. Similarly, two bits 326, 328 of information can be transmitted during the negative half-cycle 320 of the AC power signal 302.

The bits of information are represented by the presence or absence of a voltage in the respective position. As such, the thermostat 202 can transmit a bit of information, by operating the multiplexing component 216 to cause current flow in the ground-control line 208 at the appropriate time with respect to the phase of the AC power signal 302. For example, if the switch 218 of the multiplexing component 216 is closed during the first part of the positive half-cycle 318 of the AC power signal 302, current will flow in the ground-control line 208 and cause a voltage drop across the adapter network 236. The controller 232 can sense the voltage at the appropriate time and determine if the sensed voltage corresponds to bit value of 1 or 0.

FIG. 3C depicts the difference signal corresponding to transmitting 4 bits of information. The 4 bits of information can be used to indicate whether an associated piece of HVAC equipment is on or off, although more or fewer pieces of HVAC equipment may be controlled by transmitting more information bits. In addition to the 4 information bits 324, 326, 328 and 330 a header bit is transmitted. The header bit precedes the information bits and alternates values. Three header bits 322, 332 and 334 are depicted. The header bits and the information bits can be transmitted 48 times per second, assuming the AC power signal is a 60 Hz signal, since 240 bits (60 cycles/second*4 bits/cycle) can be transmitted per second, allowing 5 bits to be transmitted 48 times per second. A piece of HVAC equipment, and so the bit of information controlling it, changes on a much slower time scale. As such, the information bits will remain the same for a relatively long period of time, while the header bit will vary at a much higher rate, for example 48 times per second. The difference in the frequency at which the bits change allow the header bit to be detected, and so determine the number of information bits transmitted as well as their position and values.

As can be seen in FIG. 3C, the first bit of information 324 is 0 while the three subsequent bits of information 326, 328 and 330 are each 1. As a result, a first piece of HVAC equipment associated with the first information bit 324 would be turned off, and the pieces of HVAC equipment associated with the second, third and fourth bits of information would each be turned on.

The description with regards to FIG. 3 has assumed that a each piece of HVAC equipment can either be on or off and so controlled by a single bit of information. It is also considered that a piece of HVAC equipment could have more than two operating modes. For example, in some types of HVAC equipment, the fan can be set to OFF, LOW, MEDIUM or HIGH speed. Similarly, Heat pumps with variable speed compressors can be controlled by setting a duty cycle rather than just turning it on and off. In such cases, the control information for a single piece of HVAC equipment may be encoded by a plurality of information bits.

Figure 4:
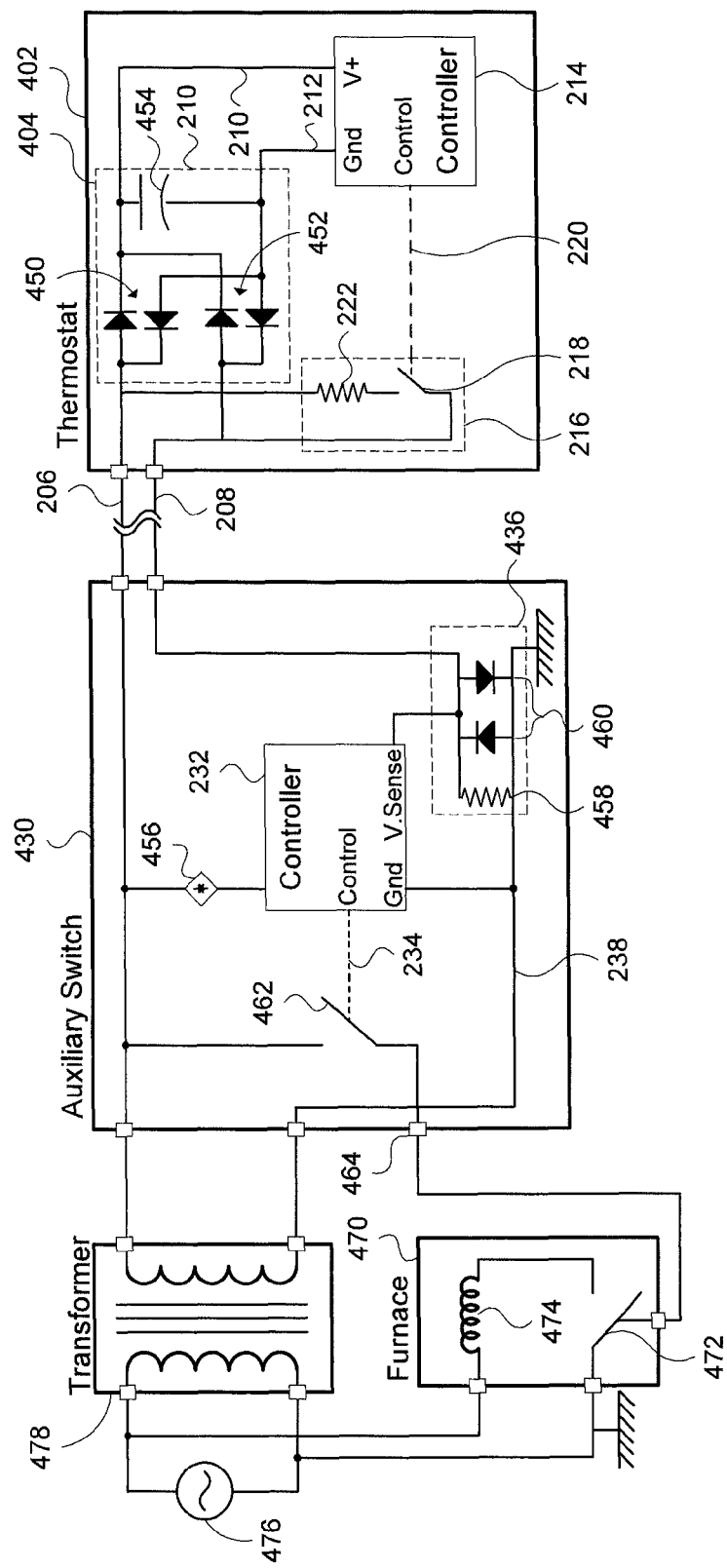
FIG. 4 depicts a block diagram of components of a further auxiliary switch and thermostat.

FIG. 4 depicts a block diagram of components of a further auxiliary switch and thermostat. The thermostat 402 is similar to thermostat 202, however the full-wave rectifier is shown in more detail. In particular, the full-wave rectifier 404 comprises two pairs of anti-parallel diodes 450, 452 for rectifying the AC power signal received over the power line and a filter capacitor 454 for filtering the rectified AC power signal to provide a DC signal 210 and a thermostat ground reference 212. The controller 214 of the thermostat 402 operates the control information multiplexing component 216. In particular a switch 218 is operated by a control signal 220 to connect a resistor 222 across the AC power line 206 and the ground-control line 208. The controller and control information multiplexing component of thermostat 402 can be substantially similar to the controller and control information multiplexing component of the thermostat 202, and as such the operation is not described in further detail.

The thermostat 402 is connected to an auxiliary switch 430 by the AC power line 206 and the ground-control information line 208. Similar to the auxiliary switch 230, the auxiliary switch 430 comprises a controller 232 for de-multiplexing control information provided by the thermostat 402 over the ground-control line 208. The controller may be powered by a rectifier 456 coupled to the AC power line. The controller 232 senses a voltage across an adapter network 436 connected in series between an auxiliary switch ground reference 238 and the ground-control line 208 and determines the control information as described above with particular reference to FIG. 3. The adapter network 436 generates a voltage that can be sensed by the controller 232 while also providing a stable ground reference to the thermostat 402.

The adapter network 436 comprises a resistor 458 for generating a voltage based on the current in the ground-control line 208. The adapter network 436 further comprises a pair of anti-parallel diodes 460 that allow current to flow in the ground-control line 208 in both directions while also clamping the voltage across the adapter network 436 to a maximum and minimum value. For typical diodes the maximum value is generally about 0.7 V and the minimum value is typically about −0.7 V. It is noted that these values are approximations of typical values, and other anti-parallel diodes that clamp the voltage to different values may be used as long as the voltage difference between the maximum and minimum values provides a stable thermostat ground reference 208.

The controller 232 senses the voltage across the adapter network and determines control information from the sensed voltage. Based on the determined controller information, the controller 232 generates a control signal 234 for controlling the operation of HVAC equipment, depicted as a furnace 470. The control signal 234 can control operation of a switch 462 that connects a low voltage AC output terminal 464 to the AC power line. The auxiliary switch 430 provides a low voltage AC output signal 464 to control the HVAC equipment.

As depicted in FIG. 4, the HVAC equipment may be a furnace 470. The operation of the furnace may be controlled by a switch or relay 472 operated by the low voltage AC output signal 464 provided by the auxiliary switch. When the low voltage AC output signal 464 is on, the switch or relay 472 may close and connect a heating element 474 to an AC main power source 476. A transformer 478 is also connected to the AC main power source 476 and provides the AC power, which is stepped down from the mains voltage to a low voltage such as 24 VAC, to the auxiliary switch 430. The transformer also provides the auxiliary switch ground reference 238. The ground reference of the transformer 478 may also be provided to the furnace or control equipment of the furnace such as the switch or relay 472 to ensure that the low voltage AC output signal 464 provided by the auxiliary switch is relative to the same ground reference at the furnace or relay 472.

Figure 5:
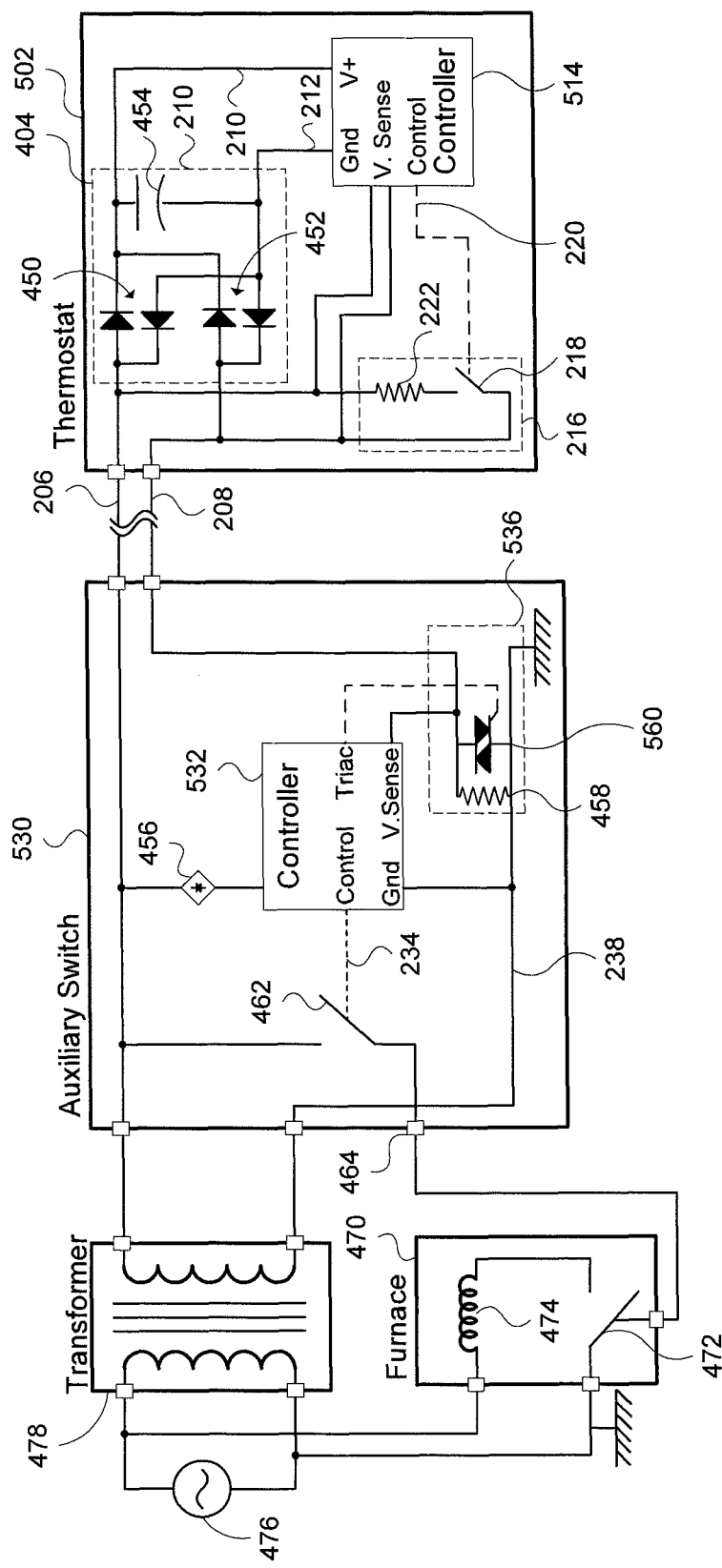
FIG. 5 depicts a block diagram of components of a further auxiliary switch and thermostat.

FIG. 5 depicts a block diagram of components of a further auxiliary switch and thermostat. The auxiliary switch 530 and thermostat 502 are substantially similar to the auxiliary switch 430 and thermostat 402 and as such only the details of the differences are described in further detail.

The auxiliary switch 530 comprises an adapter network 536 that uses a TRIAC 560 in place of the pair anti-parallel diodes 460. The controller 532 includes a TRIAC output that controls the operation of the TRIAC 560. By applying a DC signal from the TRIAC output of the controller 532 to the TRIAC 560 it operates substantially as the pair of anti-parallel diodes 560 allowing the thermostat 502 to multiplex control information onto the ground-control line 208.

Advantageously, communication from the auxiliary switch 530 to the thermostat 502 is possible by the use of the TRIAC 560. The TRIAC 560 can be fired at different times in the cycle of the AC power signal to change the voltage measured across the AC power line 206 and the ground-control line 208. The controller 514 of the thermostat 502 senses the voltage across the power line 206 and the ground-control line 208 and can detect the change from the expected voltage, and as such information can be communicated. In particular, one bit of information can be communicated during each half cycle of the AC power signal.

Figure 6:
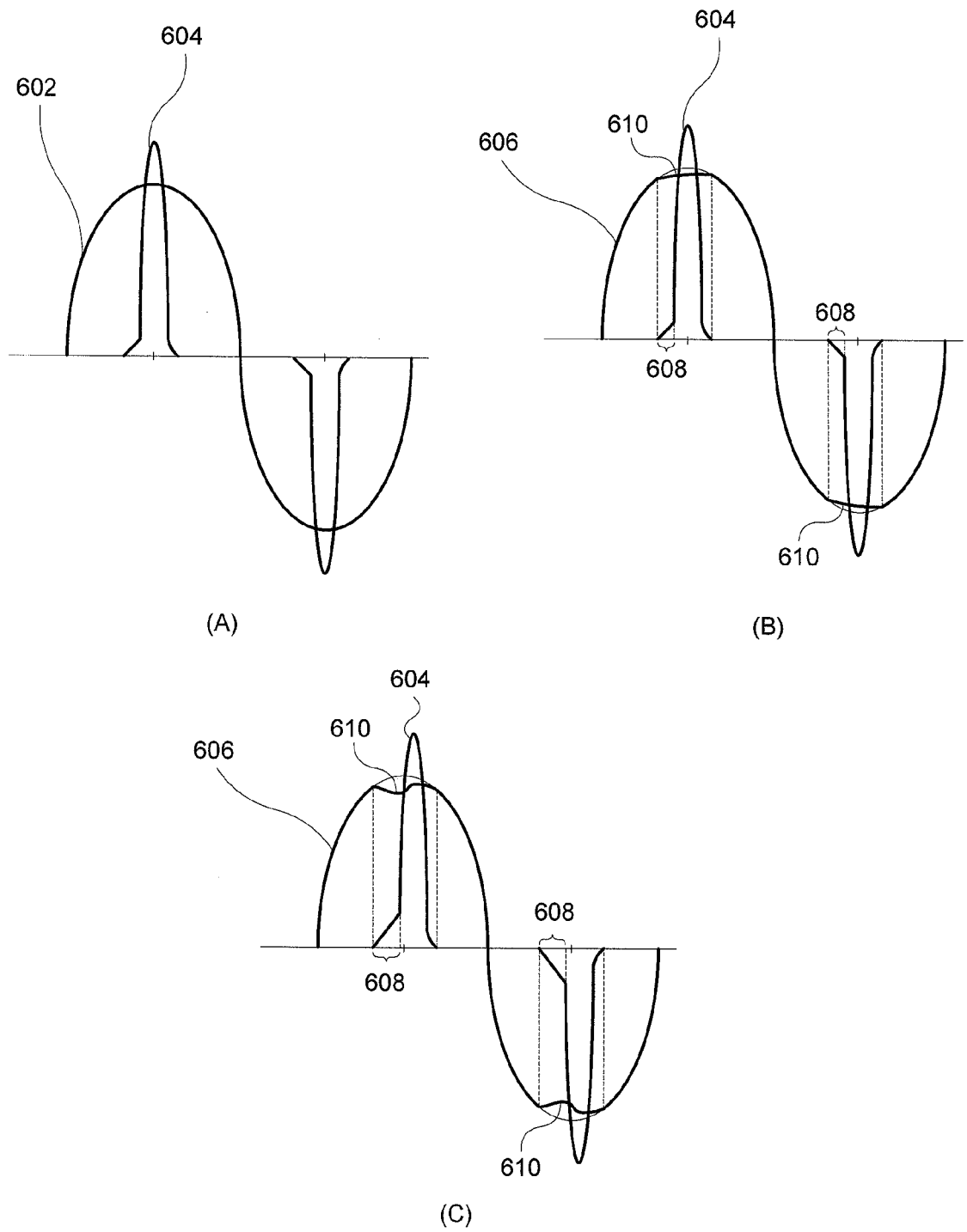
FIG. 6A-6C depict various signal diagrams associated with the operation of the TRIAC to communicate from the auxiliary switch to the thermostat.

FIG. 6 depicts various signal diagrams associated with the operation of the TRIAC to communicate from the auxiliary switch to the thermostat. FIG. 6A depicts the input voltage signal 602 between the AC power line 206 and the auxiliary switch ground reference 238 and the input current signal 604 to the full wave rectifier 404. FIG. 6B depicts the input current 604 and the voltage signal 606 measured across the AC power line 206 and the ground-control line 208. It is assumed that the TRIAC 560 is constantly fired in FIG. 6B. FIG. 6C depicts the input current 604 and the voltage signal 606 measured across the AC power line 206 and the ground-control line 208 when the firing of the TRIAC 560 is delayed.

When the input voltage signal 602 increases enough to begin charging the capacitor 454 a small charging current begins to flow as indicated by portion 608. The charging current flows through resistor 458 causing a voltage drop across the resistor. As such, the voltage 606 drops in comparison to the voltage 602 while current 604 is charging the capacitor as indicated by portion 610.

If the TRIAC is fired, a large current can flow through the TRIAC while the voltage across the resistor is clamped by the TRIAC. As such, the voltage drop between voltages 602 and 606 is limited by the clamping voltage of the TRIAC as depicted in FIG. 6 B.

However, if the firing of the TRIAC is delayed, all of the charging current will flow through the resistor 454 until the TRIAC is finally fired. As depicted by portion 610 in FIG. 6C, if the firing of the TRIAC is delayed the voltage difference between voltages 602 and 606 is not clamped by the TRIAC and so increases proportionally to the current flowing through the resistor. Once the TRIAC is fired the charging current can flow through the TRIAC and the voltage across the resistor is clamped, and as such, the voltage 606 will increase, if the firing is delayed sufficiently so as to allow a larger voltage to develop across the resistor than the clamping voltage of the TRIAC. TRIAC By sensing the voltage across the AC power line 206 and the ground-control line 208, the controller 514 of the thermostat 502 is able to detect the voltage signals of portions 610, and based on their characteristics determine if the firing of the TRIAC has been delayed, and as such determine if a bit of information is a 0 or 1. Two bits of information can be transmitted each cycle of the AC power signal.

An alternate method to provide backwards communication from the auxiliary switch back to the thermostat is to close switch 218 of the thermostat as when sending a logic bit '1' from the thermostat to the auxiliary switch, immediately after the zero-crossing of voltage signal 606: If the TRIAC is closed as a result of being fired, signal 606 will follow 602 save for the small voltage drop through the TRIAC; however, if the TRIAC is open, a clear amplitude reduction in voltage 606, reflecting the ratio between resistors 222 and 458, will be generated until the point where the TRIAC is fired.

As described above, a thermostat may detect whether the firing of the TRIAC has been delayed, and as such determine if a logic '0' or '1' is transmitted from the auxiliary switch. It should be appreciated that the firing of the TRIAC should not be delayed for such a long duration as to have a large amount of the charging current flow through the resistor 454 since this may provide an unstable ground reference to the thermostat.

Figure 7:
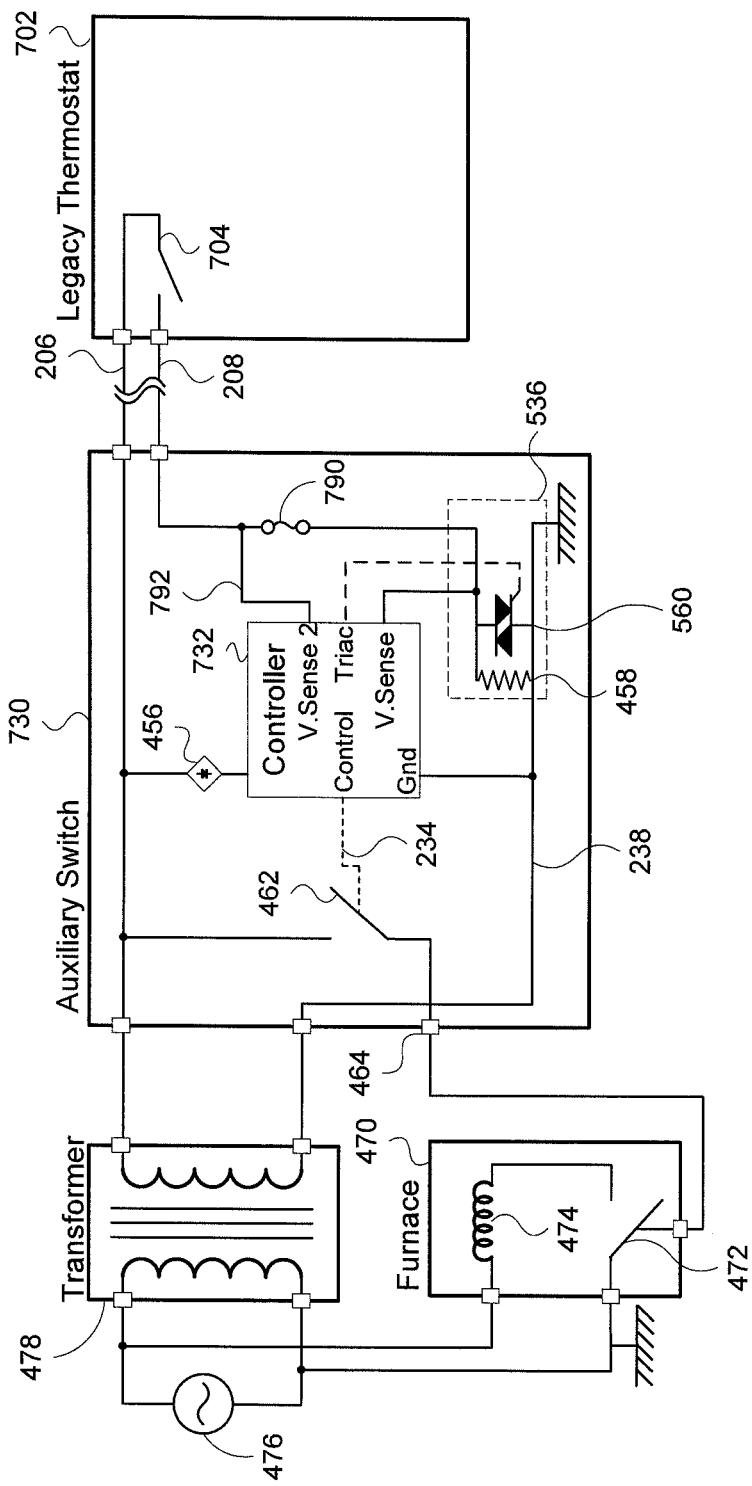
FIG. 7 depicts a block diagram of components of a further auxiliary switch.

FIG. 7 depicts a block diagram of components of a further auxiliary switch. The auxiliary switch 730 is substantially similar to the auxiliary switch 530 and as such only the details of the differences are described in further detail.

The auxiliary switch 730 has the ability to detect if a legacy thermostat 702 is connected instead of a thermostat capable of multiplexing control information on the ground-control line 208. As depicted, the legacy thermostat 702 is depicted as a simple switch 704 between the AC power line 206 and the ground-control line 208. The auxiliary switch 730 includes a re-settable fuse 790 in series between the adapter network 536 and the ground-control line 208. The controller 732 of the auxiliary switch 730 is further capable of measuring the voltage across the fuse 790, as depicted by V. Sense 2 792.

Prior to detecting the legacy thermostat 702, the auxiliary switch 730 operates as described above with regards to thermostat 502. The controller 732 constantly fires the TRIAC 560 causing it to act as a closed switch. Once the legacy thermostat 702 closes the switch 704, the full AC power signal, which may be a 24 VAC signal, is connected through the fuse 790 which will cause the fuse to open. The controller 732 detects that the fuse 790 has opened and begins to operate in a legacy mode.

In the legacy mode, the controller 732 does not fire the TRIAC 560. Eventually the re-settable fuse will close and, assuming that the switch 704 of the legacy TRIAC remains closed, the AC power signal is connected through the fuse 790. However, since the TRIAC is not fired, it acts as an open switch causing the current to flow through the resistor 458 which prevents the fuse 790 from opening again. While operating in the legacy mode, the controller can detect if the switch 704 of the legacy thermostat 702 is closed by the presence of a voltage difference across the resistor 458. The voltage difference will appear if there is current flowing, which will occur when the switch 704 is closed. When the switch 704 is open, no current will flow through the resistor 458 and so the voltage across it will be 0. The controller 732 provides the appropriate control signal 234 to operate the switch 462, which provides the AC power signal to the furnace 470, acting as if the furnace 470 was connected directly to the legacy thermostat 702.

Figure 8:
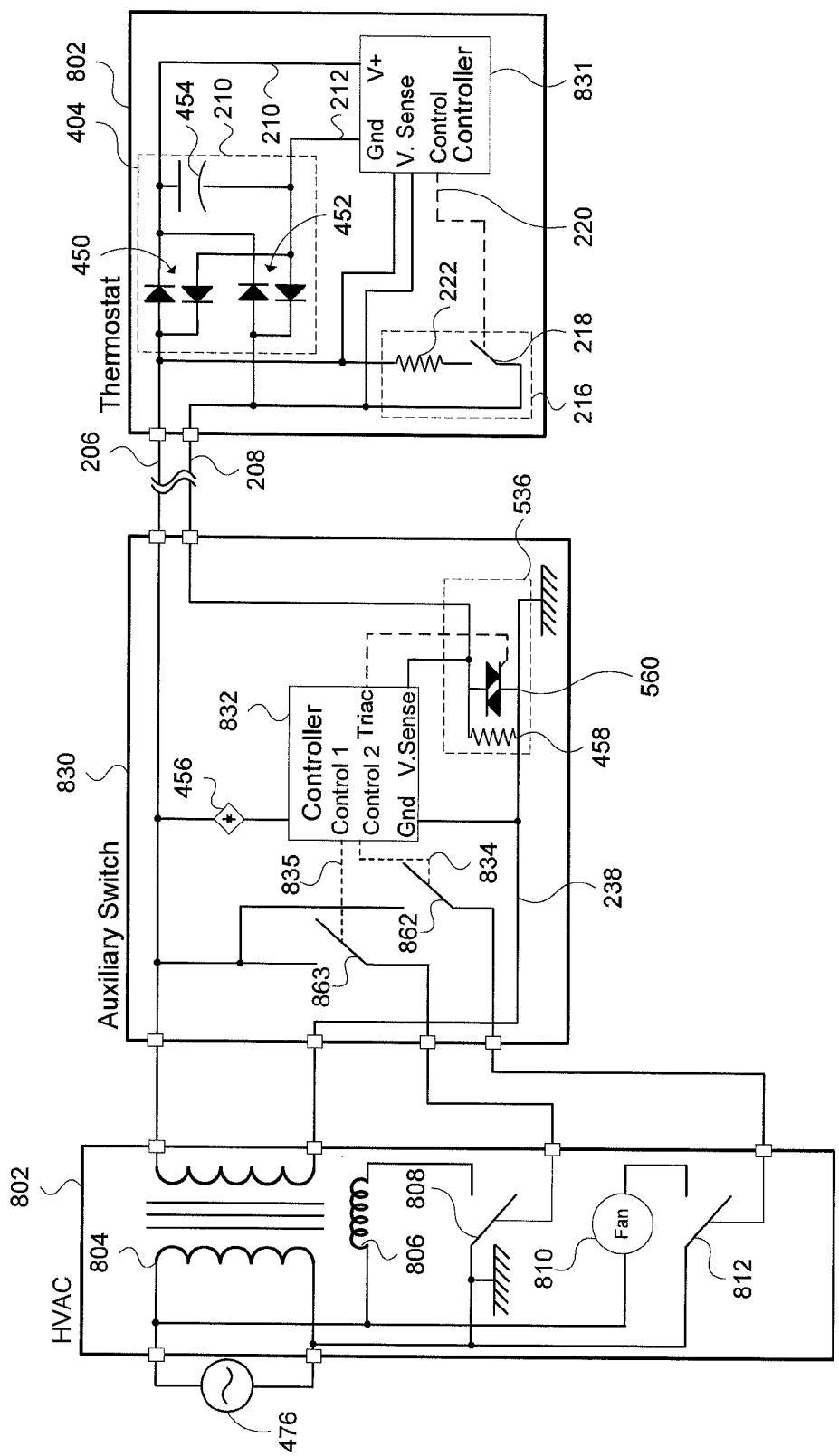
FIG. 8 depicts a block diagram of components of a further auxiliary switch and thermostat.

FIG. 8 depicts a block diagram of components of a further auxiliary switch and thermostat. The auxiliary switch 830 and thermostat 802 is substantially similar to the auxiliary switch 530 and thermostat 502 and as such only the details of the differences are described in further detail.

The auxiliary switch 830 is capable of controlling a plurality of pieces of HVAC equipment, or as depicted in FIG. 8 a single piece of HVAC equipment having multiple individually controllable components. The HVAC equipment 802 comprises a transformer 804 for providing a 24 VAC signal to the auxiliary switch 830 from an AC mains power source 476. The HVAC equipment 802 further comprises a heating element 806 controlled by a relay 808 and a fan 810 or AC compressor controlled by a relay 812.

The controller 831 of the thermostat 802 operates the control information multiplexing component 216 in order to communicate the desired state, which could be on or off, of each of the heating element 806 and the fan 810 or AC compressor. The controller 832 detects the control information from the thermostat 802 on the ground-control line 208 and determines the desired state for each of the heating element 806 and the fan 810. The controller 832 of the auxiliary switch provides corresponding control signals 835, 834 to switches 863, 862. Each switch controls one of the heating element 806 or the fan 810, when the respective switch 863, 862 is closed, the 24 VAC line is provided to the respective relay 808, 812 and the HVAC component, either the heater element 806 or the fan 810, is turned on or off accordingly.

Figure 9:
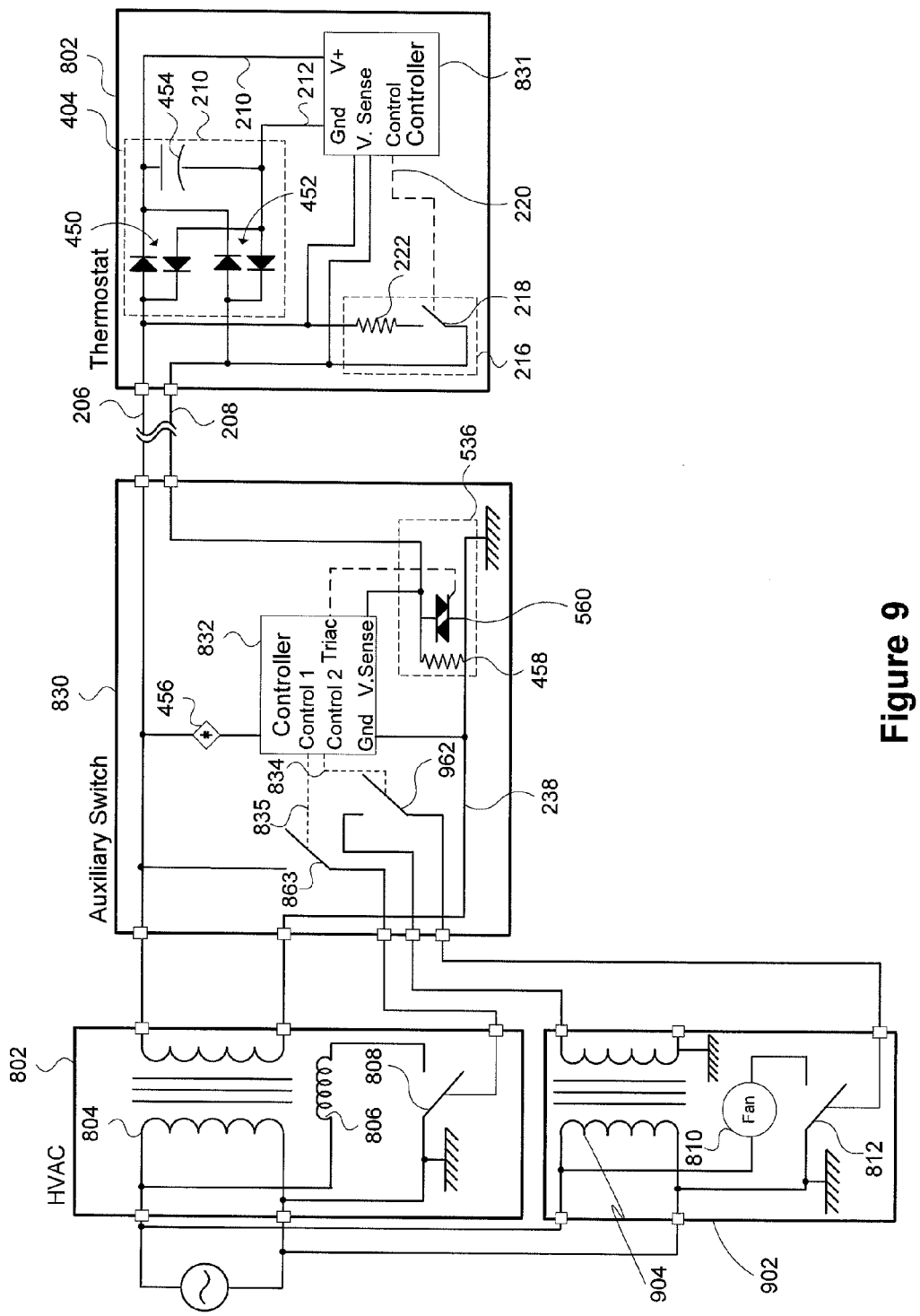
FIG. 9 depicts a block diagram of components of a further auxiliary switch and thermostat.

FIG. 9 depicts a block diagram of components of a further auxiliary switch, HVAC equipment and thermostat. The auxiliary switch 830 and thermostat 802 is substantially similar to the auxiliary switch 830 and thermostat 802 as described above with reference to FIG. 8. However, the additional HVAC components 902, such as the fan 810 or AC compressor may include a separate transformer 904 providing switching power to switch 812. The AC power, which may be 24 VAC, is provided to an isolated switch 962 of the auxiliary switch which is controlled by control signal 834 as described above with reference to switch 862. When the switch 962 is closed, AC power from the transformer 904 is provided to the relay or switch 812 and the fan 810 or AC compressor is operated.

Alternatively the control information may also be provided to one or more data connection or data terminal inputs and/or outputs connected to HVAC component or equipment. The data connection may be used independently or in conjunction with one or more switches for controlling HVAC components. The data connection can also allow configuration and control information to be sent and received through the auxiliary switch and provided to or from the thermostat.

Figure 10:
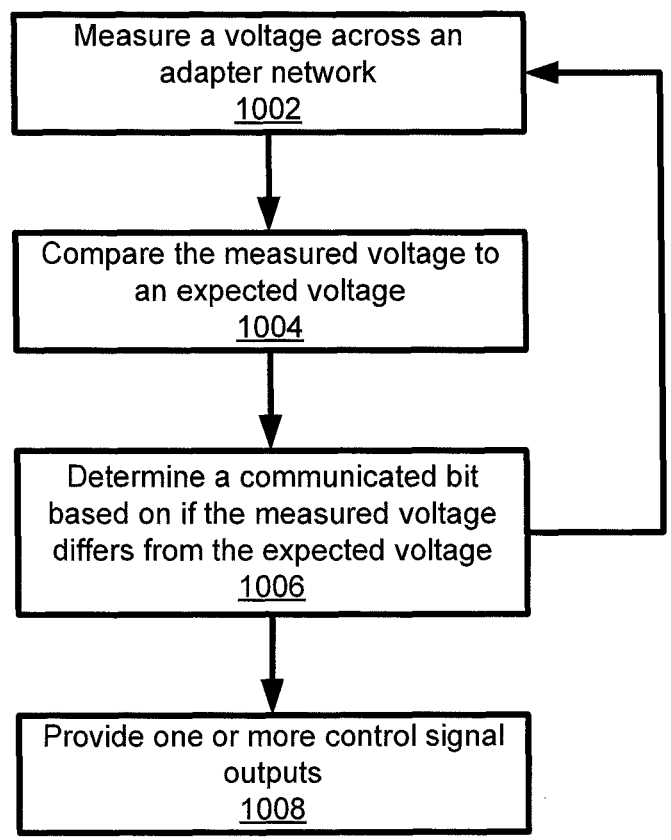
FIG. 10 depicts a method of communication from a thermostat using auxiliary switch.

FIG. 10 depicts a method of communication from a thermostat using auxiliary switch. The auxiliary switch is coupled to a thermostat employing full-wave rectification and measures a voltage across an adapter network of the auxiliary switch during a start portion and end portion of each half-cycle of an alternating current (AC) signal provided to the thermostat over an AC power line relative to a common ground line (1002). The measured voltage is compared to an expected voltage (1004). A communicated bit can then be determined based on if the measured voltage differs from the expected voltage for de-multiplexing control information multiplexed onto the common ground line by the thermostat (1006). One or more control signal outputs can then be generated to one or more heating ventilation and cooling (HVAC) components or associated switches or relays coupled to the auxiliary switch based on the determined control information (1008). The method is performed repeatedly to extract the control information. The start portion of each half cycle can begin after the AC signal crosses 0 and ends before the half-way point of the half cycle and the end portion of each half cycle can begin after the half-way point of the half cycle and ends before the AC signal crosses 0.

The auxiliary switch can also detect a repeating heading bit in the communicated bits by detecting an oscillating bit value and determine control information multiplexed onto the ground-control line by the thermostat from the communicated bits in the bits between the repeating heading bits.

In addition, through varying a voltage across the AC power line and the ground-control line the auxiliary switch can communicate to the thermostat to provide control or status information. The varying of the voltage is controlled by the auxiliary switch by varying a timing of firing of a TRIAC connected in series between the ground-control line and a ground reference of the auxiliary switch.

Although the above discloses example apparatus and methods for providing an auxiliary switch, it should be noted that such apparatus and method are merely illustrative and should not be considered as limiting. For example, it is contemplated that any or all of these hardware and software components could be embodied exclusively in hardware, exclusively in software, exclusively in firmware, or in any combination of hardware, software, and/or firmware. Accordingly, while the following describes example methods and apparatus, persons having ordinary skill in the art will readily appreciate that the examples provided are not the only way to implement such methods and apparatus.

What is claimed is:

1. An auxiliary switch for a thermostat employing full-wave rectification, the auxiliary switch comprising:
   an alternating current (AC) power output terminal for coupling a full-wave AC signal to the thermostat;
   a ground-control output terminal for providing a thermostat ground reference to the thermostat over a common ground line;
   an adapter network connected between the ground-control output terminal and an auxiliary switch ground reference, the adapter network providing a maximum and minimum voltage drop between the auxiliary switch ground reference and the thermostat ground reference to provide a stable reference at an expected maximum current flow; and
   a controller for determining voltage differences in duration between a sensed voltage signal across the adapter network and an expected un-multiplexed voltage signal duration at periodic time intervals during positive voltage periods and negative voltage periods of the full-wave AC signal and for de-multiplexing control information bits multiplexed onto the common ground line by the thermostat based on the determined voltage differences in duration.

2. The auxiliary switch of claim 1 wherein the controller generates control signal outputs to control switches for controlling one or more heating ventilation and cooling (HVAC) components coupled to the auxiliary switch in accordance with the de-multiplexed control information bits.

3. The auxiliary switch of claim 2 further comprising an AC power input terminal for receiving an AC signal connection from one of the one or more HVAC components and a ground input terminal for providing a ground connection from the one of the one or more HVAC components, where a connection between the AC signal and ground line by the thermostat energizes the one of the one or more HVAC component.

4. The auxiliary switch of claim 3 wherein the AC signal is typically a 24 VAC signal.

5. The auxiliary switch of claim 1, wherein the adapter network comprises a resistor.

6. The auxiliary switch of claim 1, wherein the adapter network comprises:

a voltage clamping circuit for clamping a voltage signal to the maximum and minimum voltage drops; and a resistor connected in parallel with the voltage clamping circuit for providing the voltage drop across the adapter network when the voltage clamping circuit is not clamping the voltage signal.

7. The auxiliary switch of claim 1, wherein the adapter network comprises:

a pair of diode junctions connected in anti-parallel; and a resistor connected in parallel with the pair of junction diodes.

8. The auxiliary switch of claim 7, wherein the pair of diode junctions are provided by one of a pair of diodes and a TRIAC controlled by the controller.

9. The auxiliary switch of claim 1, wherein the adapter network comprises a TRIAC and a resistor coupled in parallel, the firing of the TRIAC controlled by the controller.

10. The auxiliary switch of claim 9, wherein the controller changes the firing time of the TRIAC with respect to a phase of the AC signal at the AC power terminal to alter a voltage signal sensed by the thermostat to provide communication from the auxiliary switch to the thermostat.

11. The auxiliary switch of claim 1, further comprising a re-settable fuse in series between the adapter network and the ground-control terminal, the controller further monitoring a second voltage between the fuse and the ground-control terminal, the controller stopping firing of the TRIAC if the second voltage rises above a threshold allowing the auxiliary switch to function with a legacy two-wire thermostat.

12. The auxiliary switch of claim 2, wherein an isolated switch, receiving AC power independently of the auxiliary switch, is associated with a second HVAC component of the one or more HVAC components, wherein when the isolated switch is closed AC power is provided to the second HVAC component.

13. The auxiliary switch of claim 2 wherein at least a portion of the de-multiplexed control information bits are provided to a data connection to send control information to at least one of the one or more HVAC components.

14. A method of communicating between an auxiliary switch coupled to a thermostat employing full-wave rectification, the method at the auxiliary switch comprising repeatedly:

measuring a voltage duration across an adapter network of the auxiliary switch during a start portion and end portion of each half-cycle of an alternating current (AC) full-wave signal provided to the thermostat over an AC power line relative to a common ground line;

comparing the measured voltage duration to an expected un-multiplexed voltage duration during positive voltage periods and negative voltage periods of the AC full-wave signal; and determining a communicated bit based on if the measured voltage duration differs from the expected periodic voltage duration for de-multiplexing control information bits multiplexed onto the common ground line by the thermostat.

15. The method of claim 14 further comprising generating one or more control signal outputs to one or more heating ventilation and cooling (HVAC) components coupled to the auxiliary switch based on the de-multiplexed control information bits.

16. The method of claim 15, wherein the start portion of each half cycle begins after the AC signal crosses 0 and ends before a half-way point of the half cycle; and the end portion of each half cycle begins after the half-way point of the half cycle and ends before the AC signal crosses 0.

17. The method of claim 16, further comprising:

detecting a repeating heading bit in the communicated bits; and determining control information bits multiplexed onto the ground-control line by the thermostat from the communicated bits in the determined communicated bits between the repeating heading bits.

18. The method of claim 15, further comprising:

communicating from the auxiliary switch to the thermostat through varying a voltage across the AC power line and the ground-control line, the varying of the voltage controlled by the auxiliary switch by varying a timing of firing of a TRIAC connected in series between the ground-control line and a ground reference of the auxiliary switch.

19. The method of claim 15 wherein the AC signal and the ground line is between one of the one or more HVAC components where a connection between the AC signal and ground line by the thermostat energizes the one of the one or more HVAC components.

20. The method of claim 15, wherein the adapter network comprises a resistor.

21. The method of claim 15, wherein the adapter network comprises:

a voltage clamping circuit for clamping a voltage signal to the maximum and minimum voltage drops; and a resistor connected in parallel with the voltage clamping circuit for providing the voltage drop across the adapter network when the voltage clamping circuit is not clamping the voltage signal.

22. The method of claim 15, wherein the adapter network comprises:

a pair of diode junctions connected in anti-parallel; and a resistor connected in parallel with the pair of junction diodes.

23. The method of claim 22, wherein the pair of diode junctions are provided by one of a pair of diodes and a TRIAC controlled by a controller.

24. The method of claim 15, wherein the adapter network comprises a TRIAC and a resistor coupled in parallel, the firing of the TRIAC controlled by a controller.

25. The method of claim 24, wherein the controller changes the firing time of the TRIAC with respect to a phase of the AC signal at the AC power terminal to alter a voltage signal sensed by the thermostat to provide communication from the auxiliary switch to the thermostat.

26. The method of claim 15, further comprising a re-settable fuse in series between the adapter network and a ground-control terminal connected to the common ground line, a controller further monitoring a second voltage between the fuse and the ground-control terminal, the controller stopping firing of the TRIAC if the second voltage rises above a threshold allowing the auxiliary switch to function with a legacy two-wire thermostat.

27. The method of claim 15, further comprising controlling an isolated switch, receiving AC power independently of the auxiliary switch, associated with a second HVAC component of the one or more HVAC components, wherein when the isolated switch is closed AC power is provided to the second HVAC component.

28. The method of claim 15 further comprising providing at least a portion of the de-multiplexed control information bits to a data connection to send control information to at least one of the one or more HVAC components.

* * * * *